(12) United States Patent
Merkel et al.

(10) Patent No.: US 11,884,598 B2
(45) Date of Patent: Jan. 30, 2024

(54) CERAMIC HONEYCOMB BODY WITH SKIN

(71) Applicant: CORNING INCORPORATED, Corning, NY (US)

(72) Inventors: Gregory Albert Merkel, Corning, NY (US); Barbara Anna Oyer, Hornell, NY (US); Patrick David Tepesch, Corning, NY (US); James William Zimmermann, Corning, NY (US)

(73) Assignee: Corning, Incorporated, Corning, NY (US)

( * ) Notice: Subject to any disclaimer, the term of this patent is extended or adjusted under 35 U.S.C. 154(b) by 227 days.

(21) Appl. No.: 17/437,110

(22) PCT Filed: Feb. 25, 2020

(86) PCT No.: PCT/US2020/019648
§ 371 (c)(1),
(2) Date: Sep. 8, 2021

(87) PCT Pub. No.: WO2020/185394
PCT Pub. Date: Sep. 17, 2020

(65) Prior Publication Data
US 2022/0177380 A1 Jun. 9, 2022

Related U.S. Application Data

(60) Provisional application No. 62/817,043, filed on Mar. 12, 2019.

(51) Int. Cl.
*C04B 38/00* (2006.01)
*B01D 46/24* (2006.01)
(Continued)

(52) U.S. Cl.
CPC ...... *C04B 38/0006* (2013.01); *B01D 46/2462* (2013.01); *B01D 46/2482* (2021.08);
(Continued)

(58) Field of Classification Search
None
See application file for complete search history.

(56) References Cited

U.S. PATENT DOCUMENTS 5,569,455 A  10/1996 Fukui et al.
5,574,957 A  11/1996 Barnard et al.
(Continued)

FOREIGN PATENT DOCUMENTS

CN  101460424 A  6/2009
CN  201310299 Y  9/2009
(Continued)

OTHER PUBLICATIONS

International Search Report and Written Opinion of the International Searching Authority; PCT/US2020/019648; dated Jul. 9, 2020; 10 pages; European Patent Office.
(Continued)

*Primary Examiner* — Elizabeth Collister
(74) *Attorney, Agent, or Firm* — Joseph M. Homa

(57) ABSTRACT

A ceramic honeycomb body comprising a peripheral skin layer and a fiber extending around the outer periphery of a honeycomb core, the fiber embedded in the peripheral skin layer is described. A method of making a honeycomb body having a fiber extending around the outer periphery of a honeycomb core and embedded in the peripheral skin layer is also described.

15 Claims, 5 Drawing Sheets

(51) Int. Cl.
*C04B 41/45* (2006.01)
*C04B 41/50* (2006.01)
*C04B 41/52* (2006.01)
*C04B 41/83* (2006.01)
*C04B 41/86* (2006.01)
*C04B 41/89* (2006.01)

(52) U.S. Cl.
CPC ...... *C04B 41/4596* (2013.01); *C04B 41/5022* (2013.01); *C04B 41/52* (2013.01); *C04B 41/83* (2013.01); *C04B 41/86* (2013.01); *C04B 41/89* (2013.01); *B01D 2279/30* (2013.01)

(56) References Cited

U.S. PATENT DOCUMENTS

| | | |
|---|---|---|
| 5,629,067 A | 5/1997 | Kotani et al. |
| 5,780,126 A | 7/1998 | Smith et al. |
| 7,083,842 B2 | 8/2006 | Masukawa et al. |
| 7,112,233 B2 | 9/2006 | Ohno et al. |
| 8,334,230 B2 | 12/2012 | Ohno et al. |
| 8,349,124 B2 | 1/2013 | Mizuno et al. |
| 9,028,946 B2 | 5/2015 | Cai et al. |
| 9,139,479 B2 | 9/2015 | Chapman et al. |
| 2005/0272602 A1 | 12/2005 | Ninomiya |
| 2007/0151799 A1 | 7/2007 | Zuberi et al. |
| 2007/0281128 A1 | 12/2007 | He et al. |
| 2008/0241003 A1* | 10/2008 | Ido .................. B01D 53/944 428/116 |
| 2009/0208700 A1 | 8/2009 | Ohno et al. |
| 2009/0291827 A1 | 11/2009 | Ohno et al. |
| 2013/0156979 A1 | 6/2013 | Stewart |
| 2013/0224430 A1 | 8/2013 | Chapman et al. |
| 2015/0266782 A1 | 9/2015 | Gunasekaran et al. |
| 2015/0344375 A1 | 12/2015 | Chapman et al. |
| 2017/0044066 A1* | 2/2017 | Bubb .................. C04B 41/5089 |

FOREIGN PATENT DOCUMENTS

| | | |
|---|---|---|
| CN | 104023954 A | 9/2014 |
| CN | 104245630 A | 12/2014 |
| CN | 106488896 A | 3/2017 |
| EP | 0554104 A2 | 8/1993 |
| EP | 1974797 A1 | 10/2008 |
| EP | 2383087 A2 | 11/2011 |
| EP | 2130600 B1 | 9/2014 |
| JP | 01-176285 A | 7/1989 |
| WO | 00/02541 A1 | 1/2000 |
| WO | 2015/168530 A1 | 11/2015 |

OTHER PUBLICATIONS

Chinese Patent Application No. 202080020736.9, Office Action dated Aug. 17, 2022, 5 pages (English translation only), Chinese Patent Office.

* cited by examiner

CERAMIC HONEYCOMB BODY WITH SKIN

This is a national stage application under 35 U.S.C. § 371 of International Application No. PCT/US2020/019648, filed on Feb. 25, 2020, which claims the benefit of priority under 35 U.S.C. § 119 of U.S. Provisional Application No. 62/817,043 filed on Mar. 12, 2019, the content of which is incorporated herein by reference in its entirety.

TECHNICAL FIELD

Exemplary embodiments of the present disclosure relate to honeycomb bodies and, more particularly, to skinned honeycomb bodies and methods of manufacturing the same.

BACKGROUND

After-treatment of exhaust gas from internal combustion engines may use catalysts supported on high-surface area substrates and, in the case of diesel engines and some gasoline direct injection engines, a bare or catalyzed filter for the removal of soot particles. Porous ceramic flow-through honeycomb substrates and wall-flow honeycomb filters (generically referred to herein as honeycomb bodies) may be used in these applications.

As used herein, the term "honeycomb body" includes single honeycomb monoliths and honeycomb bodies formed by multiple honeycomb segments that are secured together, such as by using a paste composition to form a monolith. A paste composition may be mixed and applied to a fired, contoured or segmented honeycomb body and the wet skin allowed to dry. The act or process of applying paste composition to the exterior of the honeycomb body is referred to herein as "skinning" the honeycomb body. A honeycomb body having skin layer disposed thereon is referred to herein as a "skinned" honeycomb body. As disclosed herein, contouring refers to grinding, machining, cutting, drilling, core drilling, etc. to a desired dimension.

It would be desirable to provide skin layers for ceramic honeycomb bodies and methods of skinning ceramic honeycomb bodies that provide strength and thermal shock performance.

SUMMARY

One aspect of the present disclosure pertains to a honeycomb body comprising a honeycomb core comprising an inlet face and an outlet face defining a honeycomb core length, an outer periphery defining a circumference, and a plurality of channel walls extending from the inlet face to the outlet face defining cell channels therebetween; a peripheral skin layer on the outer periphery of the honeycomb core, the peripheral skin layer having a thickness in a range of from about 1 mm to about 3 mm, the peripheral skin layer thickness defining a midpoint and an outer surface; and a fiber extending around the outer periphery and embedded between the midpoint and the outer surface of the peripheral skin layer.

A second aspect of the present disclosure pertains to a method of preparing a honeycomb body comprising applying a fiber to a honeycomb core comprising an inlet face and an outlet face defining a honeycomb core length, an outer periphery defining a circumference, and a plurality of channel walls extending from the inlet face to the outlet face defining cell channels therebetween so that the fiber extends around the outer periphery of the honeycomb core; embedding the fiber in a paste composition applied to the outer periphery of the honeycomb; and drying the paste composition to form a peripheral skin layer, the peripheral skin layer having a thickness in a range of from about 1 mm to about 3 mm, the peripheral skin layer thickness defining a midpoint and an outer surface, wherein the fiber is embedded between the midpoint and the outer surface of the peripheral skin layer.

DETAILED DESCRIPTION

Figure 1A:
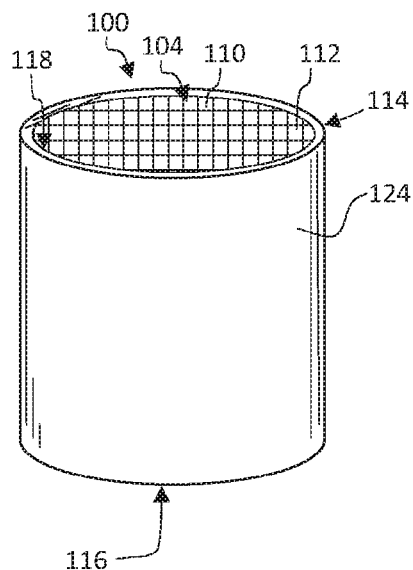
FIG. 1A shows a schematic perspective view of a honeycomb body comprising a skin on an outer periphery of a honeycomb core not filling partial cells thereof according to exemplary embodiments of the disclosure.

The subject matter of disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on", "connected to", or "adjacent to" another element or layer, it can be directly on, directly connected to, or directly adjacent to the other element or layer, or intervening elements or layers may be present. In contrast, when an element or layer is referred to as being "directly on", "directly connected to", or "directly adjacent to" another element or layer, there are no intervening elements or layers present. Like reference numerals in the drawings denote like elements.

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" modifying, for example, the quantity of an ingredient in a composition, concentrations, volumes, process temperature, process time, yields, flow rates, pressures, viscosities, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

The indefinite article "a" or "an" and its corresponding definite article "the" as used herein means at least one, or one or more, unless specified otherwise.

Specific and preferred values disclosed for components, ingredients, additives, times, temperatures, pressures, and like aspects, and ranges thereof, are for illustration only; they do not exclude other defined values or other values within defined ranges. The apparatus, and methods of the disclosure can include any value or any combination of the values, specific values, more specific values, and preferred values described herein.

As used herein, a green material is an unfired material comprising a mixture of inorganic and/or organic materials. The green material may comprise various inorganic filler materials, inorganic and/or organic binder materials, a thickener, and liquid vehicle. The green material may be dried to remove fluid content (e.g. water). Drying is often accomplished by allowing a part to sit exposed to the ambient atmosphere overnight, however, hot air, forced air, microwave, radio frequency (RF) or infrared radiation (IR) may be used to augment drying. The drying may be accomplished in humidity controlled air. Green material may comprise coldset paste compositions. The dried green material may be fired to form a porous or non-porous honeycomb core.

Honeycomb flow-through substrates and filters are used in gasoline and diesel, light duty and heavy duty vehicles for after treatment emission control. One of the steps in the production of these substrates and filters is the application of a paste composition-based skin or outer wall on the outer peripheral axial surface of the substrates and filters.

The skin on a part, such as a porous ceramic filter article, is the interface between the part and the surroundings. The skin serves several advantageous functions, for example, the skin adds to the aesthetics of the part and is valued by customers as an indicator of quality, protects the part's functional filter portion from structural degradation such as chipping damage, and other hazards surrounding the part, in manufacture and use, such as in handling and transport of the part, and adds to the isostatic strength of the part, which is a significant performance metric for modern parts.

The present disclosure is directed to a honeycomb body comprising a honeycomb core having an outer periphery and a peripheral skin layer on the outer periphery and a method of making the honeycomb body comprising the peripheral skin layer. The peripheral skin layer comprises a fiber, which in some embodiments comprises a plurality of fibers in a mesh, the fiber comprising a length that extends around the outer periphery of the honeycomb body, the fiber is embedded in the skin layer. According to one or more embodiments, the fiber(s) provides a reinforcement of the wet and dry skin so as to eliminate drying cracks, increase the strength of the skin layer, protect the underlying matrix from damage, and increase the thermal shock resistance of the article.

In some embodiments, the peripheral skin layer thickness defines a layer thickness comprising a midpoint and an outer surface, wherein the fiber is embedded between the midpoint and the outer surface of the peripheral skin layer. In some embodiments, the peripheral skin layer has a thickness in a range of from about 1 mm to about 3 mm. In exemplary embodiments, when the peripheral skin is 1 mm thick, the fiber is embedded less than 0.5 mm from the outer surface of the peripheral skin. In another exemplary embodiment, when the peripheral skin is 2 mm thick, the fiber is embedded less than 1 mm from the outer surface of the peripheral skin. In another exemplary embodiment, when the peripheral skin is 3 mm thick, the fiber is embedded less than 1.5 mm from the outer surface.

According to one or more embodiments, the ceramic bodies having the skin layer thereon do not exhibit cracks after drying. In addition, the skin layer exhibits improved pull away strength of the applied skin as measured by a nut pull test compared to existing skin layers on honeycomb cores. The skin layer protects the underlying ceramic honeycomb core from mechanical damage and exhibit improved thermal shock performance compared to existing skin layers on honeycomb cores. Pull away strength of the skin can be determined by adhering a nut fastener (the type that can be fastened to a bolt) using a high strength epoxy such as JB Weld® to the peripheral skin. A reinforced steel beam and saddle placed in its center which can then be attached to the bolt. One end was supported by steel blocking, the other end was placed on a hydraulic jack which was calibrated to read load applied in pounds to the beam. Load was applied slowly to the beam until failure occurred and the maximum load noted. The test could be similarly conducted using an Instron® or other similar tensile strength testing apparatus to pull the nut adhered to the honeycomb skin to determine the tensile force at which the skin layer pulls away from the honeycomb.

According to one or more embodiments, embedding the fiber(s) into the skin prevents development of cracks in the skin during drying. After drying, the embedded fiber forms a composite structure that provides addition mechanical reinforcement to the skin, improving the ability of the skin to protect the underlying substrate from mechanical damage in use.

While not intended to be limiting, the fiber(s) can be comprised of polymer, glass, ceramic, metal, carbon and/or polymer coated glass, ceramic metal or carbon. In some embodiments, a plurality of fibers, for example, a bundle of 10 or more fibers, such as 10 to 100 fibers may be coated by a polymer or glass to provide a coated fiber bundle. Some of the fibers may be woven into a screen, mesh, or fabric and may be applied as a planar mesh cut to a length equal to or slightly greater than the circumference of the article, or may be in the form of a cylindrical "sock" into which the article is inserted. Fiber(s) may be threads comprised of bundles of smaller diameter fibers. Some of the fibers may be coated (as in fiberglass insect screen). In some embodiments the fibers are applied as a continuous thread or monofilament wound around the circumference of the part in a parallel or overlapping pattern. While not intended to be limiting, the fibers could be in the form of a monofilament, a tow, a rope or a grouping of interlocking or weaved fibers in the form of a tape. In some embodiments, the entire applied skin contains the embedded fibers wrapped around the entire circumference and along the entire length of the article. In some embodiments, the continuous fiber is greater than the circumference of the honeycomb body, for example, at least 1.05, 1.1, 1.2, 1.3, 1.4, 1.5, 1.6, 1.7, 1.8 times the circumference of the honeycomb body. In some embodiments, the fiber is in the form of a mesh.

The honeycomb core may be shaped such that the core has a rounded periphery (cross section), including circular, elliptical, oval, racetrack, or other shape having rounded corners. The honeycomb core is preferably formed by extrusion of a green honeycomb core and firing the green honeycomb core to form a sintered ceramic honeycomb core. The sides of the honeycomb core may or may not include a fired skin prior to application of the surficial paste layer, although typically, the article does not have a fired skin layer when the paste is applied. The honeycomb core may lack a skin in the extruded green form, or the extruded skin may be removed after firing such as by mechanical grinding.

In embodiments in which the fiber comprises a plurality of fibers that are interwoven, the interwoven fibers may be in the form of a mesh or a screen. The interwoven fibers may be polymer-coated fibers comprising glass, ceramic, metal or combinations of these materials. Alternative screen weave patterns, fiber diameter, density and opening size can be provided according to one or more embodiments. In one or more embodiments, the fibers have a diameter in a range of from about 0.01 mm to about 1 mm. In embodiments that comprise a mesh, the mesh openings may be in a range of from 0.1 mm and 10 mm. In some embodiments, the orientation of the fiber alignment with respect the honeycomb core could be advantageous for some applications For example, the fibers could be aligned along the length and/or circumference, or at a specified angle determined by the particular states of stress experienced by the part during the application. Exemplary mesh or screen materials include aluminum, steel, bronze, polymer, ceramic, glass, glass-ceramic and carbon. In some embodiments, the fiber is not coated, and in other embodiments, the fiber is coated, for example, with a polymer.

In alternative embodiments, embedding the fiber in the skin layer can comprise winding the fiber from a spool around the honeycomb core, for example, by spinning the honeycomb core while unwinding fiber from a spool around it to create a pattern. In other embodiments, a tube or sleeve of fiber could slide onto the honeycomb core to avoid seams, which would be like a "sock" fitting over the core.

Figure 1B:
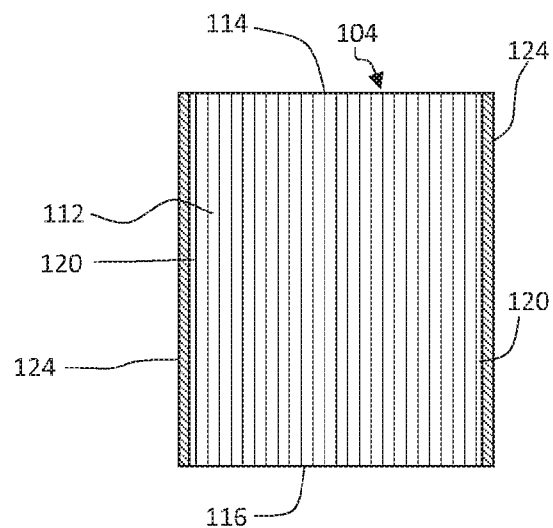
FIG. 1B is a schematic cross section through the honeycomb body of FIG. 1A according to these exemplary embodiments of the disclosure.
Figure 1C:
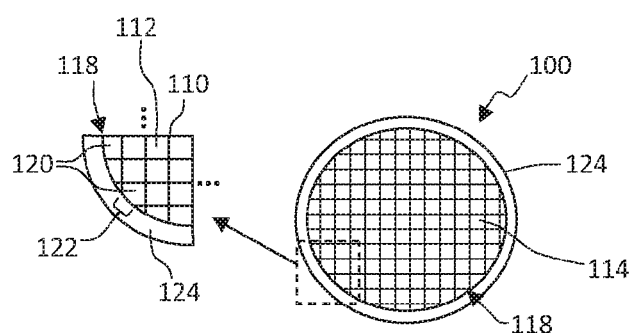
FIG. 1C is a schematic top view of the honeycomb body of FIG. 1A according to these exemplary embodiments of the disclosure.

FIG. 1A shows a honeycomb body 100 comprising a plurality of intersecting walls 110 that form mutually adjoining cell channels 112 extending axially between opposing end faces 114, 116. FIG. 1B shows a schematic cross section through the honeycomb body 100 of FIG. 1A. FIG. 1C shows a schematic top view of the honeycomb body 100 of FIG. 1A. "Cell" is generally used herein when referring to intersecting walls in cross section of the honeycomb body and "channel" is generally used when referring to a cell extending between the end faces 114, 116. Cell and channel may be used interchangeably as well as "cell channel". A "partial cell" or "partial cell channel" 120 when used herein refers to a cell or channel at the outer periphery 118 of a contoured honeycomb body 100 (honeycomb core 104) having a gap 122 in intersecting walls 110. The top face 114 refers to the first end face and the bottom face 116 refers to the second end face of the honeycomb body 100 positioned in FIG. 1A, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100.

Cell density can be between about 100 and 900 cells per square inch (cpsi). Typical cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 600/3, and 900/2. As used herein, honeycomb body 100 is intended to include a generally honeycomb structure but is not strictly limited to a square structure. For example, hexagonal, octagonal, triangular, rectangular or any other suitable cell shape may be used. Also, while the cross section of the cellular honeycomb body 100 is circular, it is not so limited, for example, the cross section can be elliptical, square, rectangular, or other desired shape.

Figure 2:
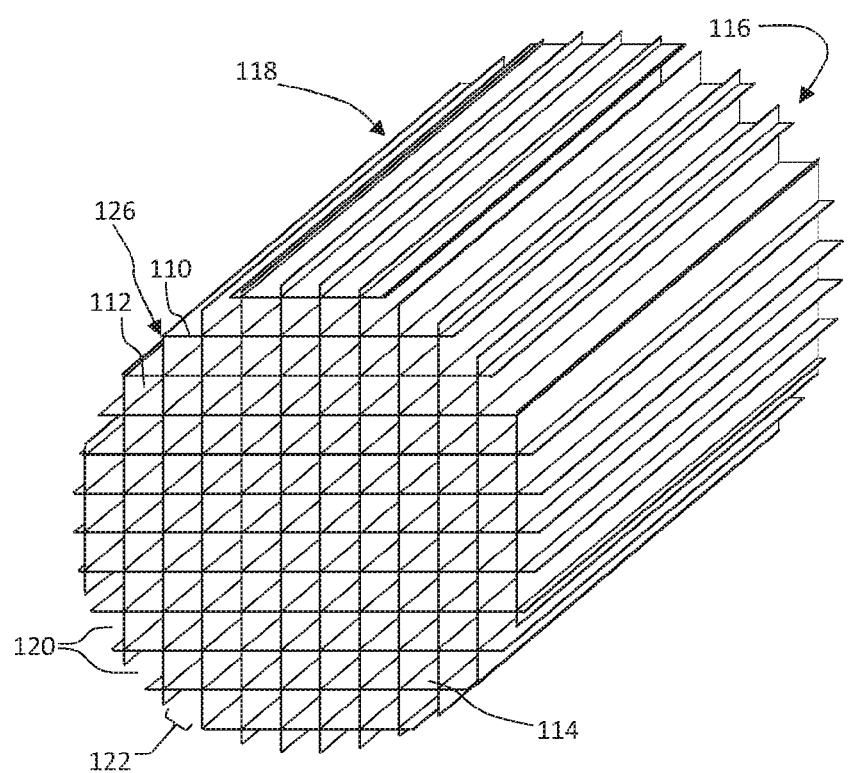
FIG. 2 shows a schematic perspective view of a honeycomb core comprising partial cells on an outer periphery thereof in a method according to exemplary embodiments of the disclosure.

The honeycomb body 100 generally comprises a honeycomb core 104 having an outer periphery 118 and a skin 124. The skin 124 may be co-extruded or applied after a contouring operation. FIG. 2 shows a perspective view of an exemplary embodiment of a honeycomb core 104 after contouring and before skinning. The honeycomb core 104 may be green and dried before contouring and skinning or may be fired. The walls 110 at the outer most periphery 118 of the contoured honeycomb core 100 may form partial cells 120 as well as cells 112. The partial cells 120 are generally spaced outward from the cells 112. However, a cell 112 may be outer most when walls 110 forming the cell 112 meet at the outer periphery 118. The outer most portions of the walls 110 of the partial cells 120 and the outer most corner 126 of some cells 112 form the outer periphery 118 of the contoured honeycomb core 104.

Exemplary embodiments of the disclosure relate to honeycomb cores having a honeycomb core 104 such as shown in FIG. 2, which may be formed of a single monolith or formed of segments paste compositioned together to form a monolith. The honeycomb core 104 comprises a plurality of channel walls 110 extending from an inlet face 114 to an outlet face 116 defining cell channels 112 and partial cell channels 120 therebetween, an outer periphery 118 extending from the inlet face 114 to the outlet face 116, where partial cell channels 120 adjoin the outer periphery 118 of the honeycomb core 104. A skin 124 is disposed on the outer periphery 118 of the honeycomb core 104 such that a majority of the total partial cell channel volume is open from the inlet face 114 to the outlet face 116 as shown in FIGS. 1A, 1B, and 1C to form a honeycomb body 100. While this disclosure relates to after-applied skins, such after-applied skins may be disposed on co-extruded skins.

In these exemplary embodiments the honeycomb core 104 may be formed from a ceramic material, such as cordierite or in other cases may be made of other ceramic materials, such as silicon carbide, silicon nitride, aluminum titanate, alumina and/or mullite, or combinations thereof.

The honeycomb body can be formed according to any conventional process suitable for forming honeycomb monolithic bodies. For example, a plasticized ceramic forming paste composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. The extruded material can be honeycomb segments connected or bonded together to form the honeycomb structures. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size.

Likewise, honeycomb segments may be shaped to a desired shape and size by removing the extruded external surface before integrating to the honeycomb structure. Alternatively, the honeycomb segments may be integrated to form a honeycomb structure and the formed honeycomb structure shaped to the desired shape and size.

Once the desired shape and size has been attained, a skin material can be applied to an outer periphery of the sized body to form a new external surface, or skin, on the body. Typically, the ends of the honeycomb body are not covered with the skin material, although certain passages may be plugged if desired. Once the skin composition has been applied to the honeycomb structure, the skin composition can be dried and/or calcined. In some embodiments a cold-set paste composition may be applied to the honeycomb structure. In some embodiments, the honeycomb core over which the paste composition is applied comprises fired ceramic material. In other embodiments, the honeycomb core comprises a green body or a calcined body. In some cases, final firing of the calcined honeycomb structure can take place during the catalyzation process.

Figure 3A:
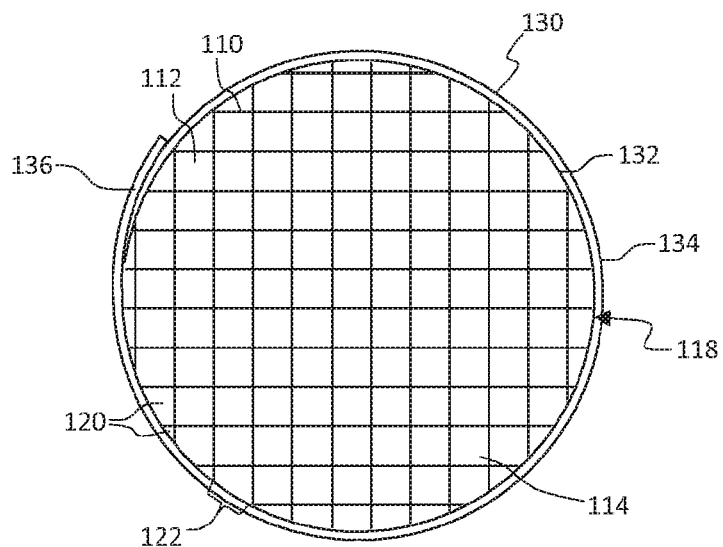
FIG. 3A shows an end view of the honeycomb core comprising partial cells on an outer periphery thereof shown in FIG. 2 having a plurality of fibers in the form of a mesh disposed on the outer periphery in a method according to these exemplary embodiments of the disclosure.
Figure 3B:
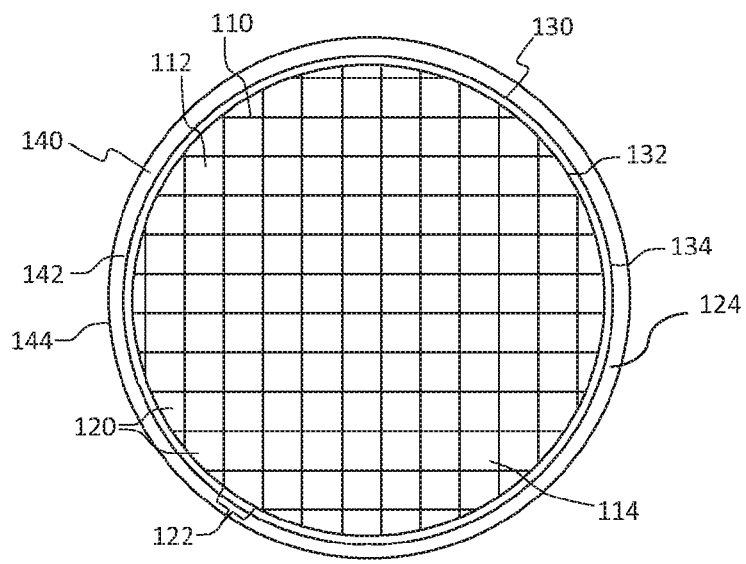
FIG. 3B shows an end view of the honeycomb core comprising partial cells on an outer periphery thereof shown in FIG. 3A having a skin batch disposed on the plurality of fibers in the form of a mesh disposed on the outer periphery in a method according to these exemplary embodiments of the disclosure.
Figure 3C:
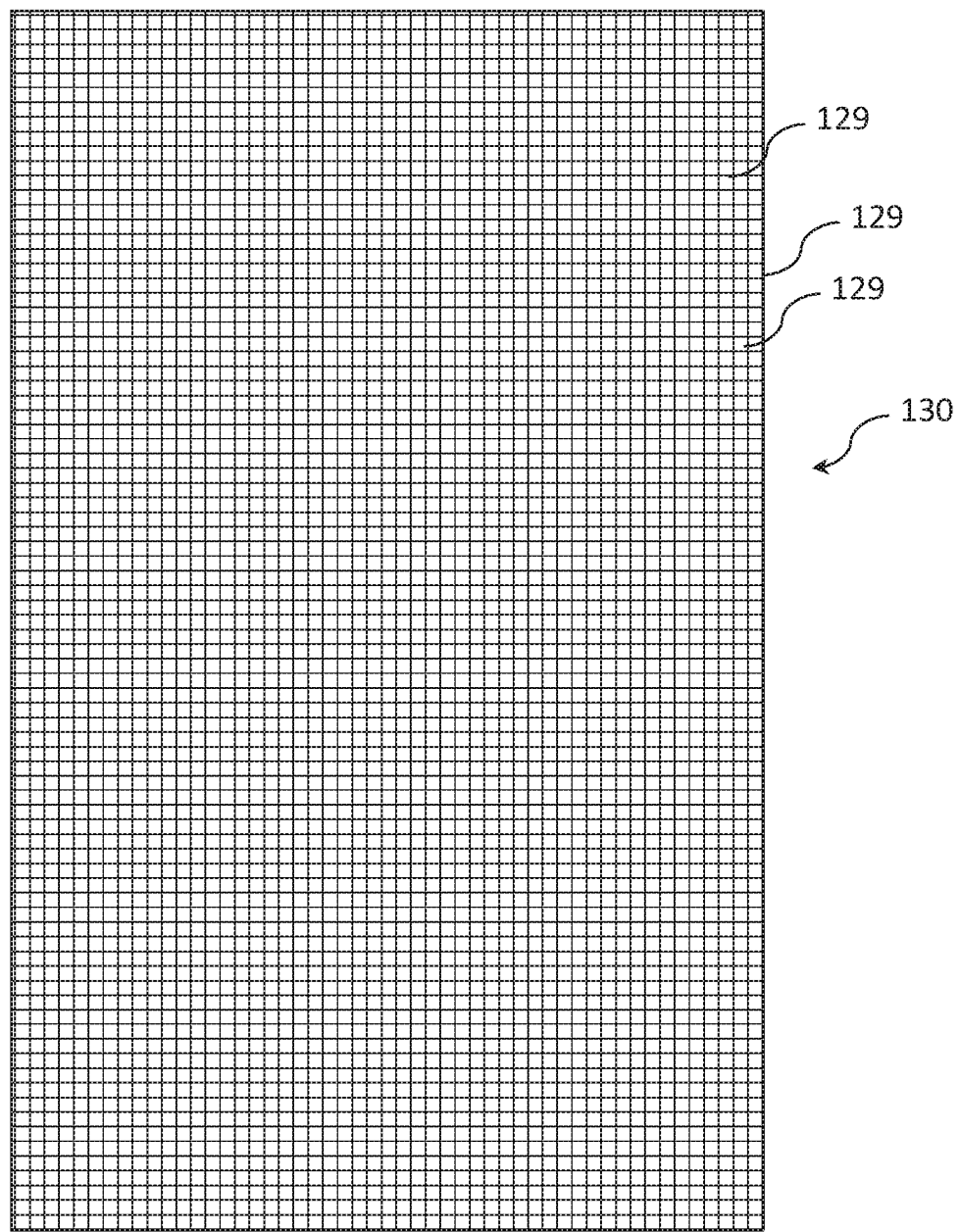
FIG. 3C shows a plan view of a mesh screen in accordance with an embodiment of the disclosure.

In these exemplary embodiments once the desired shape and size of the honeycomb core has been attained, a fiber, or a plurality of fibers is disposed on the honeycomb core and a skin paste composition is disposed on the fiber or plurality of fibers to embed the fiber or the plurality of fibers in the skin paste. Alternatively, a skin paste composition is disposed on the honeycomb core, and a fiber, or a plurality of fibers is embedded in the skin paste. FIG. 3A is a schematic end view of a honeycomb core 104 having a plurality of fibers 129 interwoven in the form or a screen or mesh 130 (as shown in FIG. 3C) disposed on the outer periphery 118. In one or more embodiments. The plurality of fibers 129 in the form of a mesh 130 has an inner surface 132 and an outer surface 134. The inner surface 132 is disposed on the outer periphery 118 such as by a wrapping operation in which the fiber inner surface 132 may overlap the mesh outer surface 134 at an overlap portion 136. Alternatively, the mesh 130 may be in the form of a sleeve with no overlap portion. When the mesh 130 is in the form of a tube or a sleeve, applying the mesh 130 to the honeycomb core 104 may comprise an operation where the mesh 130 may slide over an end face 114, 116 of the honeycomb core 104 to be disposed on the outer periphery 118. It will be understood that the mesh 130 could be replaced with a single fiber or plurality of fibers, for example, a bundle of fibers.

The mesh 130 can be disposed between the outer most portions of the walls 110 of partial cells 120 and outer most corners 126 of cells 112 that form the outer periphery 118 of the contoured honeycomb core 104 and an outer surface of the peripheral skin layer 140 formed by a skin paste composition. The mesh 130 provides a barrier to prevent skin paste composition from filling partial cells 120. FIG. 3B shows a schematic end view of a honeycomb core 104 having a mesh 130 disposed on the outer periphery 118 and a peripheral skin layer 140 disposed on the outer surface 134 of the mesh 130. The peripheral skin layer 140 has an inner surface 142 contacting the outer surface 134 of the mesh 130 and an outer surface 144 forming the outer periphery of the honeycomb body 100.

The skin paste composition can be applied to the honeycomb core 104 shrouded in the mesh 130 by a doctor blade operation, by an axial skinning operation, by a spray casting operation, by a tape casting operation, or the like. The mesh 130 prevents the peripheral skin layer 140 paste composition from filling the partial cells 120, however, the skin paste composition may penetrate the mesh 130 to contact the outer most portions of the walls 110 of the partial cells 120 and the outer most corner 126 of some cells 112 that form the outer periphery 118 of the contoured honeycomb core 104. In this sense, the mesh 130 may be porous to allow skin paste composition to contact the honeycomb core walls 110. The skin paste composition contacting the honeycomb core walls 110 bonds the peripheral skin layer 140 to the honeycomb core 104 when the skin paste composition is cured forming the honeycomb body.

In an alternative exemplary embodiment, the skin paste composition forming the peripheral skin layer 140 may be disposed on the mesh 130 prior to the operation of disposing the mesh 130 on the honeycomb core 104. In such an instance, the mesh 130 having the peripheral skin layer 140 disposed on the outer surface 134 can be applied to the honeycomb core 104 as described above.

Figure 3D:
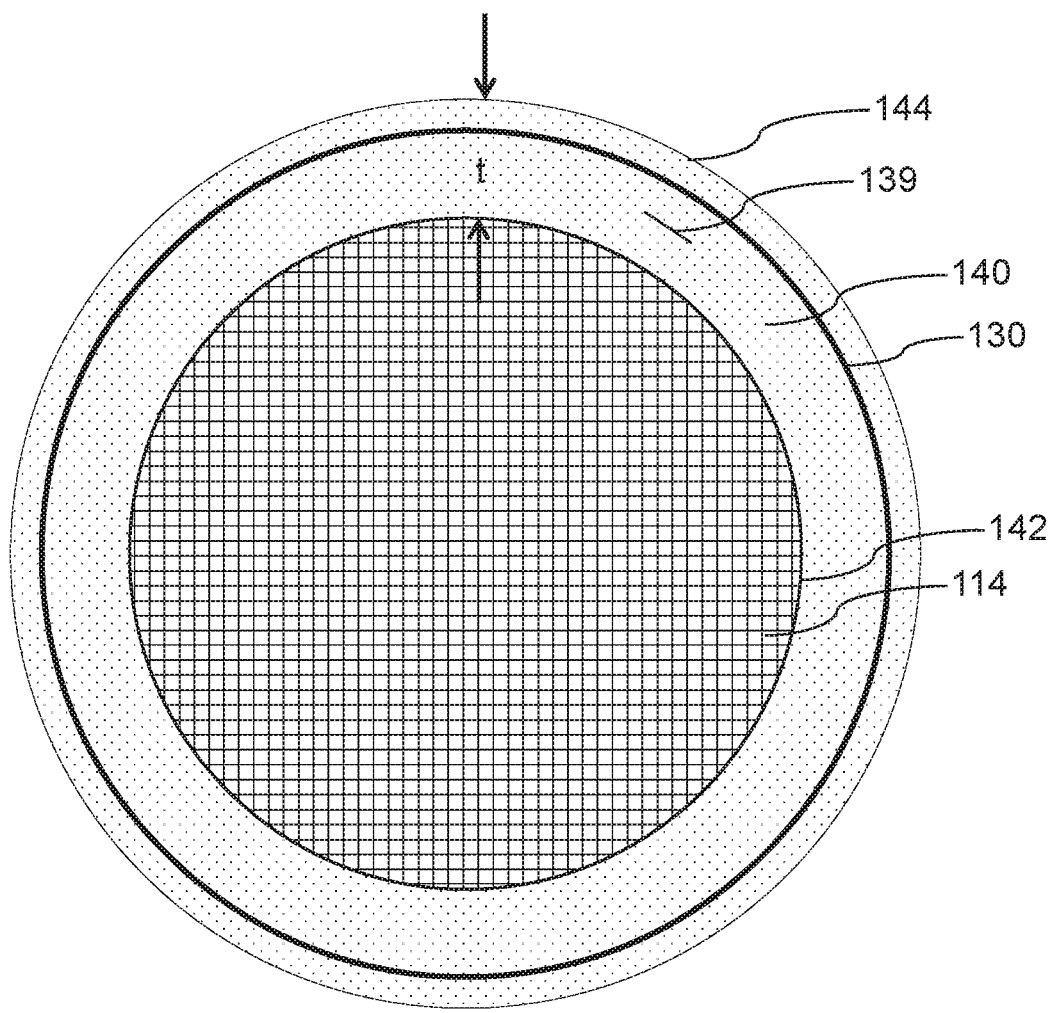
FIG. 3D shows an end view of the honeycomb core comprising cells having a peripheral skin layer disposed thereon and a plurality of fibers in the form of a mesh embedded in the peripheral skin layer.

FIG. 3D shows an embodiment comprising a honeycomb body comprising a honeycomb core 114 comprising an inlet face and an outlet face defining a honeycomb core length, an outer periphery defining a circumference, and a plurality of channel walls extending from the inlet face to the outlet face defining cell channels. A peripheral skin layer 140 is on the outer periphery of the honeycomb core 114, the peripheral skin layer 140 having a thickness "t" in a range of from about 1 mm to about 5 mm, for example from about 1 mm to about 4 mm, for example from about 1 mm to about 3 mm. The peripheral skin layer thickness "t" defines an inner surface 142 on the outer periphery of the honeycomb cored 114, a midpoint 139 of the peripheral layer 140 and an outer surface 144. A person of ordinary skill in the art will understand that the midpoint 139 is 50% of the thickness "t" of the peripheral skin layer 140. As shown, there is fiber, which can be a plurality of fibers in the form of a mesh 130 extending around the outer periphery and embedded between the midpoint 139 and the outer surface 144 of the peripheral skin layer 140.

Once the mesh 130 has been embedded in the skin paste composition on the honeycomb structure in a manner as described herein, the peripheral skin layer 130 can be optionally dried and/or fired. The optional drying step can comprise first heating the skin material in a humidity controlled atmosphere at a temperature and for a period of time sufficient to at least substantially remove any liquid vehicle that may be present in the skin material. As used herein, at least substantially removing any liquid vehicle comprises the removal of at least 95%, at least 98%, at least 99%, or even at least 99.9% of the liquid vehicle present in the skin material prior to firing. Exemplary and non-limiting drying conditions suitable for removing the liquid vehicle comprise heating the skin material at a temperature of at least 50° C., at least 60° C., at least 70° C., at least 80° C., at least 90° C., at least 100° C., at least 110° C., at least 120° C., at least 130° C., at least 140° C., at least 150° C., at least 160° C., at least 170° C., at least 180° C., at least 190° C., or even at least 200° C. In one embodiment, the conditions effective to at least substantially remove the liquid vehicle comprise heating the skin material in a humidity controlled atmosphere, such as air, at a temperature in the range of from 60° C. to 120° C. Further, the heating can be provided by any conventionally known method, including for example, hot air drying, RF and/or microwave drying in a humidity controlled atmosphere.

The optional firing step can include conditions suitable for converting the skin material to a primary crystalline phase ceramic composition comprise heating the honeycomb with applied skin material to a peak temperature of greater than 800° C., 900° C., and even greater than 1000° C. A ramp rate of about 120° C./hr during heating may be used, followed by a hold at the peak temperature for a temperature of about 3 hours, followed by cooling at about 240° C./hr.

Skin material disclosed herein can include those that set at a temperature of less than 200° C., such as a temperature of less than 100° C., and further such as a temperature of less than 50° C., including paste composition material that can be used in skinning processes employing "cold set" skins. In cold set skinning, only drying of the skinning mixture is required to form a seal of the channel walls of the honeycombs. When a cold set skinning process is employed, heating of the skinned honeycombs to temperatures in the 35-110° C. range can be useful to accelerate drying. In some cold set skinning processes, it is anticipated that final skin consolidation, including the removal of residual temporary binder bi-products such as the fiber mesh 130 and strengthening of the seals, can occur in the course of subsequent processing steps (e.g., in the course of catalyzation or canning) or during first use (e.g., in an exhaust system).

For example, exemplary compositions in which cold set skinning may be employed include those comprising a refractory filler that comprises at least one inorganic powder, such as at least one of aluminum titanate, cordierite, fused silica, mullite, and alumina, the inorganic powder having a bimodal or mono sized median particle size ($D_{50}$) of from 15 to 50 microns, such as from 30 to 40 microns for mono sized and additionally a median particle size in a range from about 150 microns to about 300 microns, such as from about 150 microns to about 250 microns for the second particle size in bimodal size compositions, and a gelled inorganic binder, such as gelled colloidal silica. At least one gelling agent, such as at least one of hydrochloric acid, sulfuric acid, nitric acid, citric acid, and acetic acid, ammonium hydroxide, sodium hydroxide, and triethanol amine (hereinafter "TEA") may be added either before (e.g., as a pre-mix with the gelled inorganic binder) or during paste compositioning in order to gel the inorganic binder. Alternatively a non-gelled composition may be used. Such compositions can provide skins that set in a porous ceramic honeycomb body (and be thereby permanently sealed to the channel walls) at a temperature of less than 200° C., such as less than 100° C., and further such as less than 50° C., including about 25° C. Further non-limiting exemplary embodiments of paste composition compositions used for skinning are discussed below.

Skin paste compositions are described in U.S. Pat. Nos. 8,999,483 and 9,834,481, the contents of which are incorporated herein by reference in their entirety. According to exemplary embodiments the skin composition may be a single glass powder composition comprising a paste composition comprising a glass powder as a low thermal expansion filler material, a binder and a solvent or vehicle for carrying the solid constituents of the glass-based paste composition. The glass of the glass powder filler material may be an amorphous fused silica ($SiO_2$), ground cordierite, AT grog, or silica soot. The glass powder filler material can have a median particle size (D50) between 10 and 20 μm, with a minimum particle size between 7 μm and 75 μm and a maximum particle size between 50 μm and 70 μm. Particle size determined as a mass-based equivalent spherical diameter. The glass powder filler material may comprise, for example, from 60-80 wt. % of the total inorganic components of the paste composition. Suitable silica powder filler materials are available, for example, under the trade name Teco-Sil, available from CE Minerals of Tennessee Electro Minerals Incorporated, Tennessee, USA. All particle size measurements herein were made with a Microtrac Inc. particle size analyzer, unless otherwise indicated.

In specific embodiments, a fused silica material of USS Sieve Grade −200F is suitable to provide a skin layer over a mesh that has improved pull strength, for example, exceeding 5 lbf, having an average particle size in a range of from 20 micrometers to 35 micrometers, for example 22 micrometers to 30 micrometers.

According to some embodiments the skin composition may comprise an amorphous glass-based paste composition, the paste composition formed from a dual glass powder composition comprising a first (fine) glass powder as a low thermal expansion filler material, a second (coarse) glass powder as a low thermal expansion filler material, a binder and a solvent or vehicle for carrying the solid constituents of the glass-based paste composition. The glasses of both the first glass powder filler material and the second glass powder filler material may be amorphous fused silica having particle sizes greater than about 1 μm. The distribution of glass powder filler material particle size can be multimodal in that a distribution of the glass powder filler material with particle sizes greater than about 1 μm exhibits multiple modes (local maximums) of particle sizes. In one embodiment, the amorphous glass-based paste composition comprises a bimodal particle size distribution of amorphous glass particles with a particle size greater than about 1 μm. The glass based paste composition may comprise a first glass powder filler material wherein a median (D50) particle size of the first glass powder filler material can be in a range from about 10 to about 50 μm, from about 15 μm to about 50 μm, from about 20 μm to about 45 μm or from about 30 μm to about 45 μm, with a D10 in a range from about 1 μm to about 10 μm and D90 in a range from about 25 μm to about 125 μm. A median (D50) particle size of the second glass powder filler material can be in a range from about 150 μm to about 300 μm, in a range from about 150 μm to about 250 μm, in a range from about 170 μm to about 230 μm, in a range from about 180 μm to about 220 μm, with D10 in a range from about 100 μm to about 150 μm, and D90 in a range from about 250 μm to about 350 μm. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. The dual glass based paste composition may contain, for example, an amount of the first glass powder filler material in a range from about 20 to about 60 wt. % of the total weight of the inorganic solid components of the paste composition, in a range from about 25 wt. % to about 50 wt. %, in a range from about 25 wt. % to about 40 wt. %, or in a range from about 25 wt. % to about 35 wt. %. The glass based paste composition may contain, for example, an amount of the second glass powder filler material in a range from about 10 wt. % to about 40 wt. % of the total weight of the inorganic solid components of the paste composition, in a range from about 15 wt. % to about 40 wt. %, in a range from about 20 wt. % to about 35 wt. %.

In one exemplary embodiment, D50 of the first glass powder filler material may be in a range from about 34 μm to about 40 μm, and a median particle size of the second glass powder filler material is in a range from about 190 μm to about 280 μm. In one example, the first glass powder filler material has a D10 of about 6.0 μm, a D50 of about 34.9 μm and a D90 of about 99 μm. In another example, the first glass powder filler material has a D10 of about 6.7 μm, a D50 of about 39.8 μm, and a D90 of about 110.9 μm. In still another example, the first glass powder has a D10 of about 2.7 μm, a D50 of about 13.8 μm and a D90 of about 37.8 μm, and as yet another example, the first glass powder filler material has a D10 of about 2.8 μm, a D50 of about 17.2 μm and a D90 of about 47.9 μm.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1.2 to about 1:1 or from about 1:1.5 to about 1:1. In an exemplary embodiment, the ratio of the second glass powder filler material to the first glass powder filler material is 1:1.

To provide the paste composition compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel is a suitable organic binder. Methocel A4 is a water-soluble methyl cellulose polymer binder available from Dow Chemical. A suitable inorganic binder may comprise colloidal silica or alumina comprising nanometer-scale silica or alumina particles suspended in a suitable liquid, such as water. The inorganic binder material can be present in the paste composition in an amount less than about 10% of the total weight of inorganic solids present in the paste composition, and in some exemplary embodiments inorganic binders are present in an amount equal to or less than about 5 wt. %, and in certain other exemplary embodiments in a range from about 2 wt. % to about 4 wt. % taking into account the fluid portion of the organic binder (wherein the weight contribution of the fluid portion is removed). A suitable colloidal silica binder material is Ludox HS40 produced by W.R. Grace. Typical colloidal binder materials may comprise approximately 40% by weight solid material as a suspension in a deionized water vehicle.

In some exemplary embodiments, the single and dual glass powder paste compositions described supra may also comprise an inorganic fibrous reinforcing material. For example, aluminosilicate fibers may be added to the paste composition mixture to strengthen the honeycomb structure after application of the skin. For example, the paste composition may comprise an inorganic fibrous material from about 25 to about 50 wt. % of the total weight of the inorganic solid components of the paste composition, from about 30 to about 50 wt. %, and in some embodiments from about 35 to about 45 wt. % of the total weight of the inorganic solid components of the paste composition. In certain other embodiments, fibrous inorganic reinforcing materials may be present in an amount from about 36 wt. % to about 43 wt. % as a percentage of the total weight of the inorganic solids of the paste composition. A suitable inorganic fibrous reinforcing material is Fiberfrax QF 180, available from Unifrax, however, any high aspect ratio refractory particulate could be used.

Typically, the liquid vehicle or solvent for providing a flowable or paste-like consistency has included water, such as deionized (DI) water, although other materials may be used. The liquid vehicle content may be present as a super addition in an amount equal to or less than about 30 wt. % of the inorganic components of the paste composition mixture, can be in a range from about 10 wt. % to about 25 wt. % of the inorganic components of the paste composition mixture. However, the liquid vehicle is typically adjusted to obtain a viscosity suitable to make the paste composition easy to apply.

In some embodiments the paste composition may optionally further contain organic modifiers, such as adhesion promoters for enhancing adhesion between the paste composition and the honeycomb body. For example, Michem 4983 has been found suitable for this purpose.

In certain exemplary embodiments, the paste composition mixture sets at a temperature of less than 1000° C., such as a temperature of less than 800° C., and further such as a temperature of less than 600° C., and yet further such as a temperature of less than 400° C., and still yet further such as a temperature of less than 200° C. In certain exemplary embodiments, the paste composition mixture is capable of setting at room temperature (i.e., at about 23° C.).

Cement compositions described herein can exhibit viscosities well suited for forming an external skin layer over a mesh on a honeycomb core. For example, compositions according to the embodiments herein can have an infinite shear viscosity equal to or less than about 12 Pascal-seconds (Pa·s), equal to or less than about 5 Pa·s, or equal to or less than about 4 Pa·s. For a shear rate of $10 \text{ s}^{-1}$, the shear viscosity may, for example, be equal to or less than about 400 Pa·s, equal to or less than about 350 Pa·s or less than or equal to about 300 Pa·s. Viscosity was measured using a parallel plate viscometer.

Calcining of paste composition compositions disclosed herein can be conducted in a box furnace with a linear ramp to 600° C. in 3 hours, followed by a hold for 3 hours at 600° C., then followed by a ramp down to room temperature over a time period of 3 hours. In commercial use, the honeycomb core can be wash coated with catalyst followed by a heat treatment to remove organic materials. The honeycomb core can also be canned with a mat material that may also require heat treatment to remove organic materials. The calcining process simulates service conditions experienced by the honeycomb core.

The ingredients of the skin paste composition are not particularly limited and can include, for example, a skin paste composition of single glass powder compositions, dual glass powder compositions, single glass powder with fibrous reinforcing material compositions, dual glass powder with fibrous reinforcing material compositions, inorganic filler and crystalline inorganic fibrous material compositions, and dual glass powder and crystalline inorganic fibrous material compositions.

EXAMPLES

Exemplary embodiments of the disclosure are further described below with respect to certain exemplary and specific embodiments thereof, which are illustrative only and not intended to be limiting. In accordance with some of the embodiments, a 2 in (5 cm) diameter cordierite honeycomb core having 200 cpsi and 12 mil wall (200/12) geometry was prepared. The 2 in (5 cm) honeycomb core was contoured from a 5.7 in (14.5 cm)×6 in (15.3 cm) part.

Example 1

The skin paste composition provided below in Table 1 was mixed on a Mazerustar mixer (Medisca, Inc.) and doctor-bladed onto cordierite honeycomb with a fiberglass screen. The fiberglass screen used in this Example was a standard vinyl-coated fiberglass insect screen from Home Depot®, which was embedded after applying the paste to the coupon. The paste layer was applied at 2 mm thickness via a template frame, and dried at 50° C.

Comparative Example 2

The skin paste composition provided below in Table 1 was mixed on a Mazerustar mixer (Medisca, Inc.) and doctor-bladed onto cordierite honeycomb without a fiberglass screen. The paste layer was applied at 2 mm thickness via a template frame, and dried at 50° C. Cracks were observed in the skin layer upon visual observation.

"Nut-pull" tests were conducted on the same 5 spots twice on part made according to Example 1. The screen remained behind, protecting the matrix and skin below the screen from damage. The average nut-pull force was 4.2 lbf for the first test and 5.1 lbf for the second test.

TABLE 1

| Material | Mass (g) |
| --- | --- |
| CE Minerals −80/+105 Silica | 113.64 |
| CE Minerals −200 F. Silica | 113.64 |
| Nyco Nyglos 8 Wollastonite | 22.73 |
| Hydroxypropyl Methylcellulose - Dow A4M | 2.50 |
| Veegum Pro granules | 1.25 |
| Ludux HS-40 colloidal silica | 79.55 |
| DI water | 47.50 |

Example 3

A skin paste composition was prepared as in Example 1, except that all of the coarse grog was replaced with fine grog. The composition of the skin paste composition is shown in Table 1. As in Example 1, the paste layer was 2 mm thick, applied via a template frame, but dried at 70° C. instead of 50° C. The higher level of fine grog improved strength in Example 3, as compared to Example 1, but makes the skin more prone to cracking in drying with no screen embedded. But with the embedded screen, however, drying cracks did not form. The average nut-pull for Example 3 was 8 lbf, substantially higher than Example 1. Embedding the mesh allows the use of skin pastes that have higher strength (higher nut-pull), but would otherwise be prone to drying cracks in the absence of an applied screen.

TABLE 3

| Material | Mass (g) |
| --- | --- |
| CE Minerals −200 F. Silica | 227.27 |
| Nyco Nyglos 8 Wollastonite | 22.73 |
| Hydroxypropyl Methylcellulose - Dow A4M | 2.50 |
| Veegum Pro granules | 1.25 |
| Ludux HS-40 colloidal silica | 79.55 |
| DI water | 70 |

Comparative Example 4

The skin paste composition provided above in Table 2 was mixed on a Mazerustar mixer (Medisca, Inc.) and doctor-bladed onto cordierite honeycomb without a fiberglass screen. The paste layer was applied at 2 mm thickness via a template frame, and dried at 70° C. Cracks were observed in the skin layer upon visual observation.

Comparative Example 5

A skinning paste having the composition of Table 1 was applied on 12" diameter, 6" long EX-26 control parts and same using a radial doctor-blade skinner (the part is rotated with a stationary doctor blade applying a uniform thickness of paste to the surface of the part), but with 5.5" wide by 39" long. A Fiberglass screen was embedded in the skin layer. The skin paste composition mixed on planetary mixer. There were some drying cracks in areas of the parts where the screen did not go all the way to the edge of the part, but no drying cracks in the regions where the screen was embedded

Example 6

A skinning paste having the composition of Table 1 was applied on 12" diameter, 6" long EX-26 control parts and same using a radial doctor-blade, but with 5.5" wide by 39" long A Fiberglass screen was embedded in the skin layer. The skin paste composition mixed on a planetary mixer. There were some drying cracks in parts without the embedded screen.

Three parts of each of Examples 5 and 6 were thermal shocked in an elevator-oven thermal shock experiment starting at 500° C. and increasing at 50° C. increments until cracks were observed. One part of Comparative Example 5 (comparative) failed at 550° C. and two parts failed at 600° C.

Two parts of Example 6 (inventive) failed at 600° C. and one part failed at 650° C. The cracks in the inventive example were less connected and shallower.

Advantages according to one or more embodiments described herein provide a skinned honeycomb body with fewer or no drying cracks, improved strength of the applied skin layer, protection of the underlying matrix and improved thermal shock performance.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. A honeycomb body comprising:
    a honeycomb core comprising an inlet face and an outlet face defining a honeycomb core length, an outer periphery defining a circumference, and a plurality of channel walls extending from the inlet face to the outlet face defining cell channels therebetween;
    a peripheral skin layer on the outer periphery of the honeycomb core, the peripheral skin layer having a thickness in a range of from about 1 mm to about 3 mm, the peripheral skin layer thickness defining a midpoint and an outer surface; and
    a continuous single fiber or bundle of fibers extending around the outer periphery and embedded between the midpoint and the outer surface of the peripheral skin layer.

2. The honeycomb body of claim 1, wherein the fiber comprises a continuous single fiber wound around the outer periphery of the honeycomb core and extending between the inlet face and the outlet face.

3. The honeycomb body of claim 2, wherein the continuous fiber is wound in an overlapping pattern around the honeycomb body.

4. The honeycomb body of claim 1, wherein the peripheral skin layer comprises 50-95 wt. % fused silica and 5-30% colloidal silica.

5. The honeycomb body of claim 4, wherein the fused silica has an average particle size in a range of from 20 micrometers to 35 micrometers.

6. The honeycomb body of claim 5, wherein the fused silica comprises −200 F sieve grade fused silica.

7. The honeycomb body of claim 1, wherein the peripheral skin layer further comprises from about 5 wt. % to 25 wt. % colloidal silica.

8. The honeycomb body of claim 7, wherein the peripheral skin layer further comprises a binder and a thickener.

9. The honeycomb body of claim 1, wherein the fiber comprises a polymer-coated fiber.

10. A method of preparing a honeycomb body comprising:
    applying a continuous single fiber or bundle of fibers to a honeycomb core comprising an inlet face and an outlet face defining a honeycomb core length, an outer periphery defining a circumference, and a plurality of channel walls extending from the inlet face to the outlet face defining cell channels therebetween so that the fiber extends around the outer periphery of the honeycomb core;
    embedding the fiber in a paste composition applied to the outer periphery of the honeycomb; and
    drying the paste composition to form a peripheral skin layer, the peripheral skin layer having a thickness in a range of from about 1 mm to about 3 mm, the peripheral skin layer thickness defining a midpoint and an outer surface, wherein the fiber is embedded between the midpoint and the outer surface of the peripheral skin layer.

11. The method of preparing the honeycomb body of claim 10, wherein the paste composition is dried at a temperature of from about 35° C. to about 100° C.

12. The method of preparing the honeycomb body of claim 10, wherein the peripheral skin layer comprises 50-95 wt. % fused silica and 5-30% colloidal silica.

13. The method of preparing the honeycomb body of claim 12, wherein the fused silica has an average particle size in a range of from 20 micrometers to 35 micrometers.

14. The method of preparing the honeycomb body of claim 12, wherein the fused silica comprises −200 F sieve grade fused silica.

15. The method of preparing the honeycomb body of claim 14, wherein the peripheral skin layer further comprises from about 5 wt. % to 25 wt. % colloidal silica.

* * * * *